(12) United States Patent
Park

(10) Patent No.: US 12,088,122 B2
(45) Date of Patent: Sep. 10, 2024

(54) WIRELESS POWER TRANSMISSION DEVICE AND WIRELESS POWER TRANSMISSION METHOD

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 17/915,462

(22) PCT Filed: Feb. 8, 2021

(86) PCT No.: PCT/KR2021/001608
§ 371 (c)(1),
(2) Date: Sep. 28, 2022

(87) PCT Pub. No.: WO2021/201413
PCT Pub. Date: Oct. 7, 2021

(65) Prior Publication Data
US 2023/0126095 A1    Apr. 27, 2023

Related U.S. Application Data

(60) Provisional application No. 63/003,832, filed on Apr. 1, 2020.

(30) Foreign Application Priority Data

Apr. 6, 2020    (KR) .................. 10-2020-0041739

(51) Int. Cl.
H02J 50/80    (2016.01)
H02J 50/10    (2016.01)
H02J 50/60    (2016.01)

(52) U.S. Cl.
CPC .............. *H02J 50/80* (2016.02); *H02J 50/10* (2016.02); *H02J 50/60* (2016.02)

(58) Field of Classification Search
CPC ............ H02J 50/80; H02J 50/10; H02J 50/60
See application file for complete search history.

(56) References Cited

U.S. PATENT DOCUMENTS

2020/0336021 A1*    10/2020    Park .................. H02J 50/80

FOREIGN PATENT DOCUMENTS

KR    20140017758         2/2014
KR    20140017758 A  *    2/2014    .............. H02J 7/00
(Continued)

OTHER PUBLICATIONS

PCT International Application No. PCT/KR2021/001608, International Search Report dated Jun. 1, 2021, 4 pages.

*Primary Examiner* — Jared Fureman
*Assistant Examiner* — Duc M Pham
(74) *Attorney, Agent, or Firm* — LEE, HONG, DEGERMAN, KANG & WAIMEY

(57) ABSTRACT

A wireless power transmission device according to one embodiment of the present specification transmits wireless power to a wireless power reception device, and comprises: a power conversion circuit that transmits the wireless power to the wireless power reception device; and a communication/control circuit that communicates with the wireless power reception device and controls the wireless power, wherein the communication/control circuit transmits, to the wireless power reception device, a data packet comprising information on a number of slots and the length of the slots, for performing detection of foreign substances using the slots.

8 Claims, 21 Drawing Sheets

(56) References Cited

FOREIGN PATENT DOCUMENTS

| | | | | |
|---|---|---|---|---|
| KR | 2015118967 | 8/2015 | | |
| KR | 20180002206 | 1/2018 | | |
| KR | 20180002206 A | * 1/2018 | .............. | H02J 50/60 |
| KR | 20190131469 | 11/2019 | | |
| KR | 20200033053 | 3/2020 | | |
| WO | 2015118967 | 8/2015 | | |

* cited by examiner

FIG. 3b

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

FIG. 11

| $B_0$ | Requested Power Transmitter Data Packet ($b_7$ $b_6$ $b_5$ $b_4$ $b_3$ $b_2$ $b_1$ $b_0$) |

FIG. 12

| | b7 | b6 | b5 | b4 | b3 | b2 | b1 | b0 | |
|---|---|---|---|---|---|---|---|---|---|
| B0 | (mbs) | Major Version | | Minor Version | | | | | |
| B1 | Manufacturer code | | | | | | | | |
| B2 | | | | | | | | | (lsb) |

FIG. 13

|  | b7 | b6 | b5 | b4 | b3 | b2 | b1 | b0 |
|---|---|---|---|---|---|---|---|---|
| B0 | Reserved | | | Negotiable Load Power | | | | |
| B1 | Reserved | | | Potential Load Power | | | | |
| B2 | Dup | AR | OB | Buffer Size | | | WPID | NRS |

FIG. 14

| | b7 | b6 | b5 | b4 | b3 | b2 | b1 | b0 |
|---|---|---|---|---|---|---|---|---|
| B0 | Reserved | | Number of slots | | | Slot length | | |
| B1 | Reserved | | | | | | | |
| B2 | Reserved | | | | | | | |

FIG. 15

| | Request | Parameter |
|---|---|---|
| $b_0$ | | |
| $b_1$ | | |
| $b_2$ | | |
| $b_3$ | | |
| $b_4$ | | |
| $b_5$ | | |
| $b_6$ | | |
| $b_7$ | | |
| | $B_0$ | $B_1$ |

FIG. 17

| $b_7$ | $b_6$ | $b_5$ | $b_4$ | $b_3$ | $b_2$ | $b_1$ | $b_0$ |
|---|---|---|---|---|---|---|---|
| $B_0$ | Setting Time | Slot Length | | | | Mode | |
| $B_1$ | (mbs) | | | | | | |
| $B_2$ | Estimated Received Power value | | | | | | (lsb) |

# WIRELESS POWER TRANSMISSION DEVICE AND WIRELESS POWER TRANSMISSION METHOD

CROSS-REFERENCE TO RELATED APPLICATIONS

This application is the National Stage filing under 35 U.S.C. 371 of International Application No. PCT/KR2021/001608, filed on Feb. 8, 2021, which claims the benefit of earlier filing date and right of priority to Korean Application No. 10-2020-0041739, filed on Apr. 6, 2020, and also claims the benefit of U.S. Provisional Application No. 63/003,832, filed on Apr. 1, 2020, the contents of which are all incorporated by reference herein in their entirety.

BACKGROUND OF THE DISCLOSURE

Field of the Disclosure

The present specification relates to a wireless power transmitter, a wireless power receiver for receiving wireless power from the wireless power transmitter, and a wireless power transmission method and wireless power reception method using the wireless power receiver and the wireless power transmitter.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a wireless power transmission device, a wireless power transmission method, a wireless power reception device, a wireless power reception method, and a wireless charging system that perform foreign object detection during power transmission.

The technical problems of the present specification are not limited to the problems mentioned above, and other problems not mentioned will be clearly understood by those skilled in the art from the following description.

A wireless power transmitter according to an embodiment of the present specification for solving the above problems transfers a wireless power to a wireless power receiver, and comprises a power conversion circuit configured to transfer the wireless power to the wireless power receiver and a communication/control circuit configured to communicate with the wireless power receiver and control the wireless power, wherein the communication/control circuit is configured to transmit, to the wireless power receiver, a data packet including information for a number of slots and a length of a slot for performing a foreign object detection using the slot.

A wireless power transmission method according to an embodiment of the present specification for solving the above problems transfers a wireless power to a wireless power receiver, the method is performed by a wireless power transmitter and comprises transmitting, to the wireless power receiver, a data packet including information for a number of slots and a length of a slot for performing a foreign object detection using the slot.

Other specific details of this specification are included in the detailed description and drawings.

Foreign object detection can be performed during power transmission.

Since the wireless power transmitter can transmit information on the slot required for foreign object detection to the wireless power receiver, it is possible to perform more stable slotted Q FOD by presenting slot information that matches the foreign object detection performance of the wireless power transmitter.

Effects according to the present specification are not limited by the contents exemplified above, and more various effects are included in the present specification.

BRIEF DESCRIPTION OF THE DRAWINGS

FIG. 3b shows an example of a WPC NDEF in a wireless power transfer system.

FIG. 11 is a diagram illustrating a format according to an example of a GRQ packet.

FIG. 12 is a diagram illustrating a format according to an example of an ID packet.

FIG. 13 is a diagram illustrating a format according to an example of a CAP packet.

FIG. 14 is a diagram illustrating a format according to an example of an XCAP packet.

FIG. 15 is a diagram illustrating a format according to an example of an SRQ packet.

FIG. 17 is a diagram illustrating a format of a message requesting foreign object detection (FOD) according to an example.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
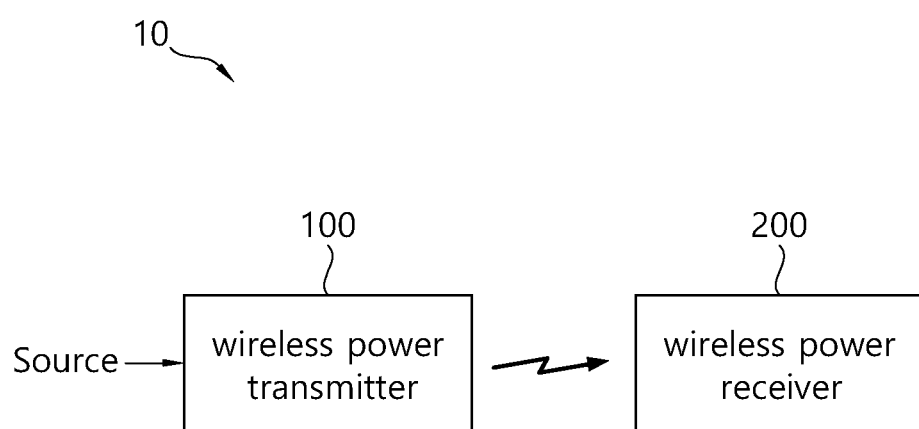
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
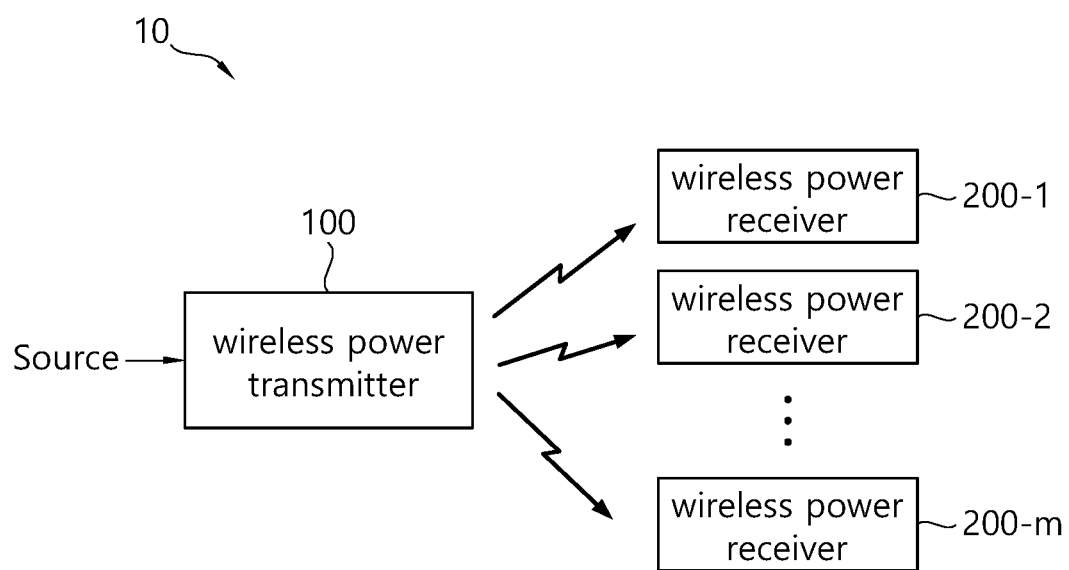
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, ..., 200-M). Most particularly, in case the wireless power transfer (or transmission) is performed by using a magnetic resonance method, one wireless power transmitter (100) may transfer power to multiple wireless power receivers (200-1, 200-2, ..., 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
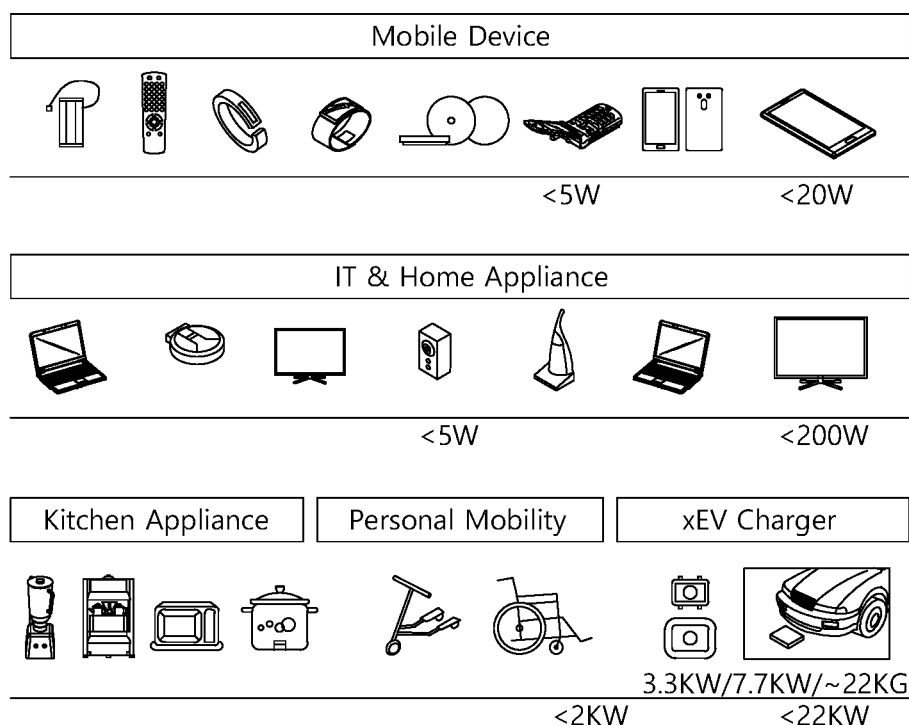
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than SW and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than SW. The application of PC-1 includes wearable devices, such as smart watches.

The PC0 standard relates to wireless power transmitters and receivers providing a guaranteed power of SW. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30

W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
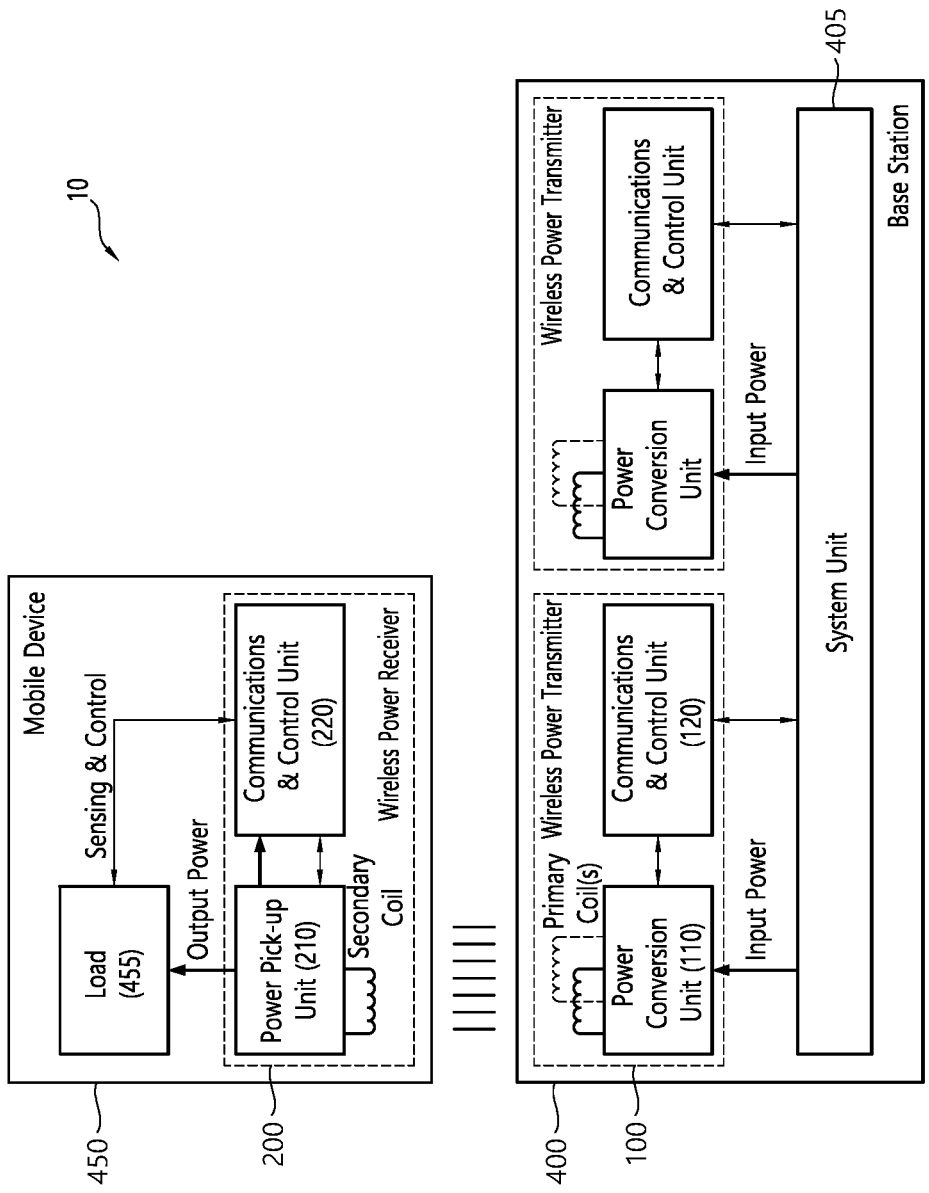
FIG. 4a is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Referring to FIG. 4a, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4B:
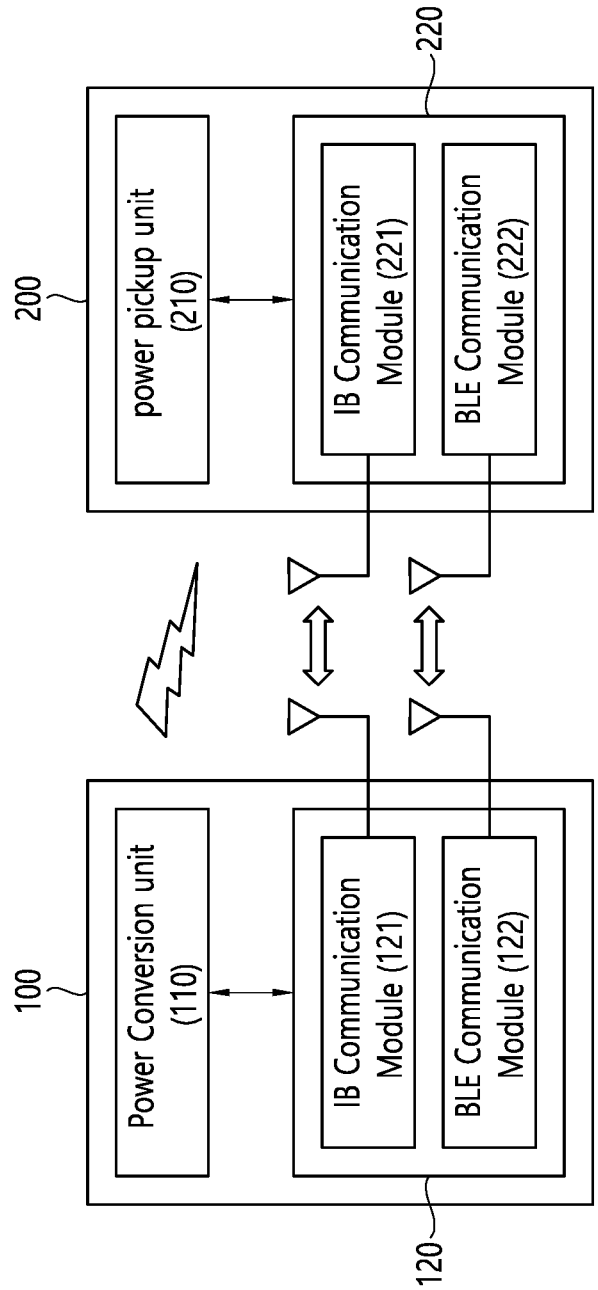
FIG. 4b is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4b.

FIG. 4b is a block diagram illustrating a wireless power transfer system using BLE communication according to an example.

Referring to FIG. 4b, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4b. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4C:
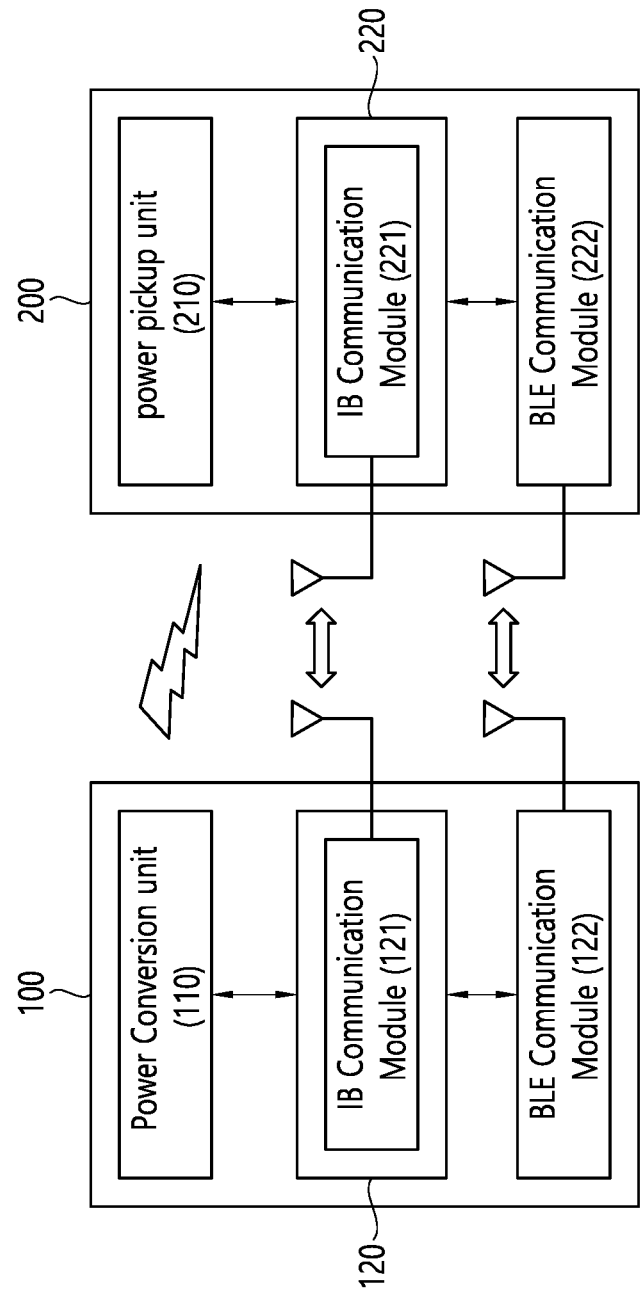
FIG. 4c is a block diagram illustrating a wireless power transfer system using BLE communication according to another example.

FIG. 4c is a block diagram illustrating a wireless power transfer system using BLE communication according to another example.

Referring to FIG. 4c, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
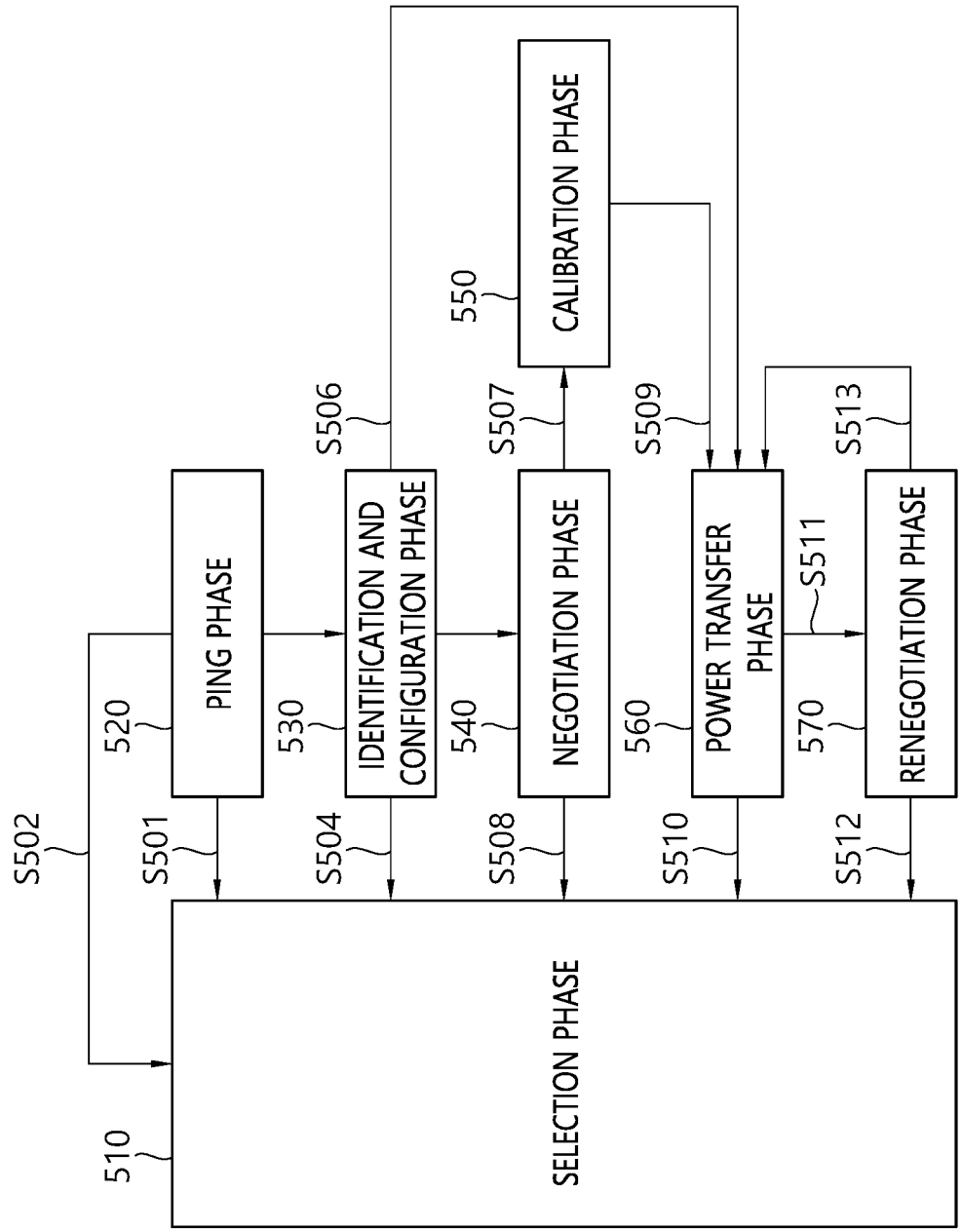
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal(or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the identifying and configuring step 530 may also be referred to as a configuration step.

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
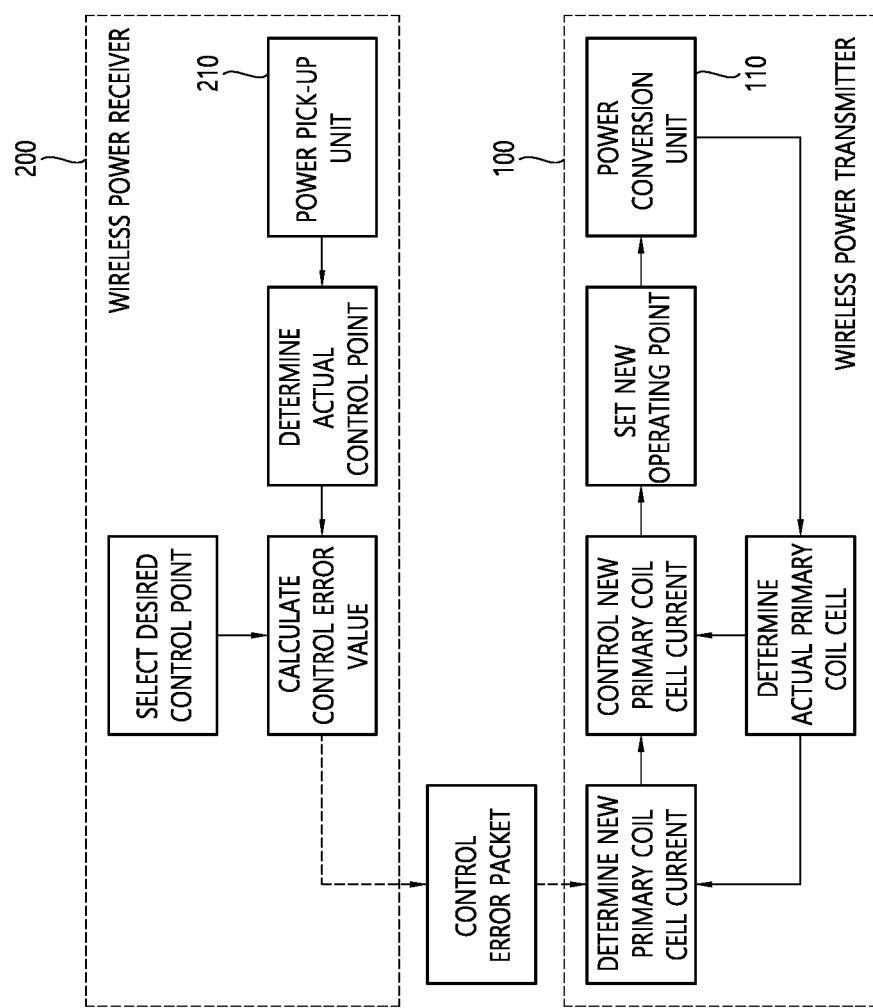
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
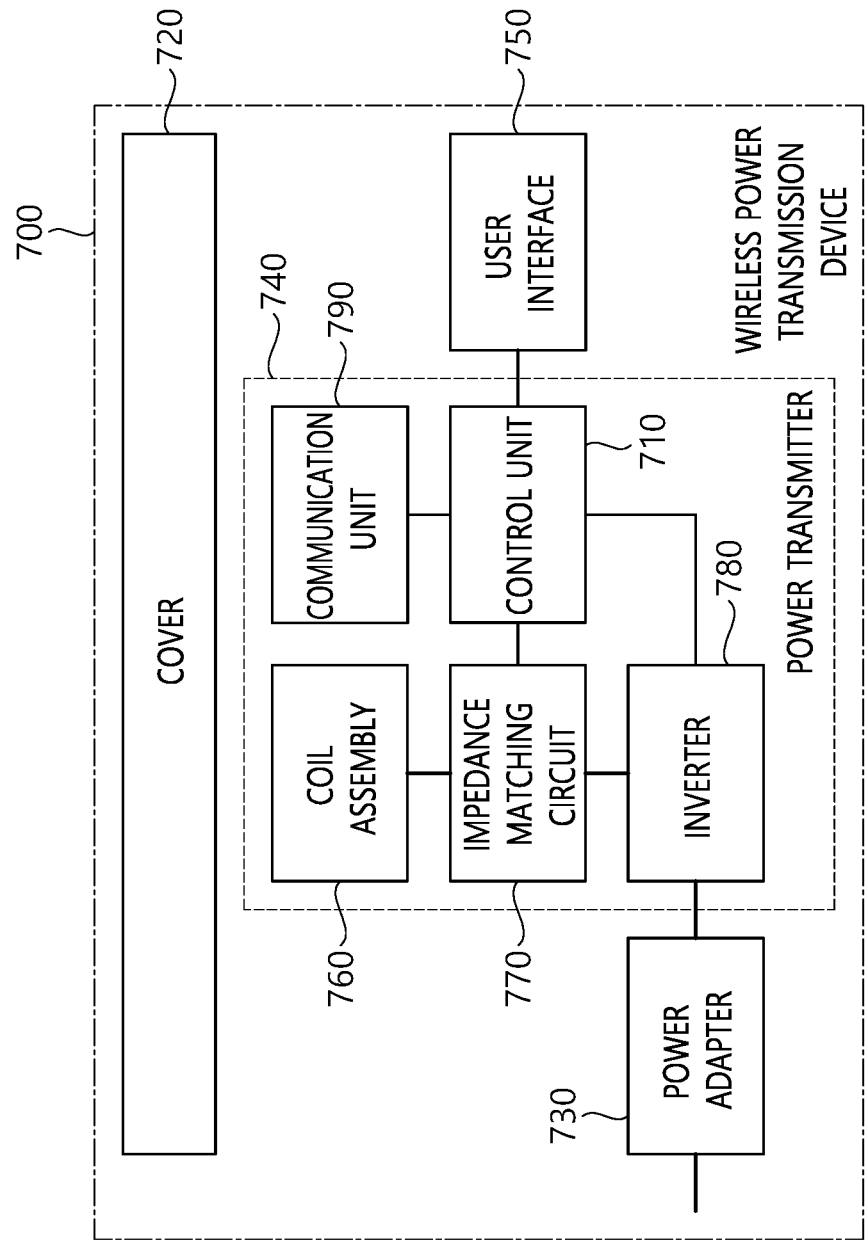
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
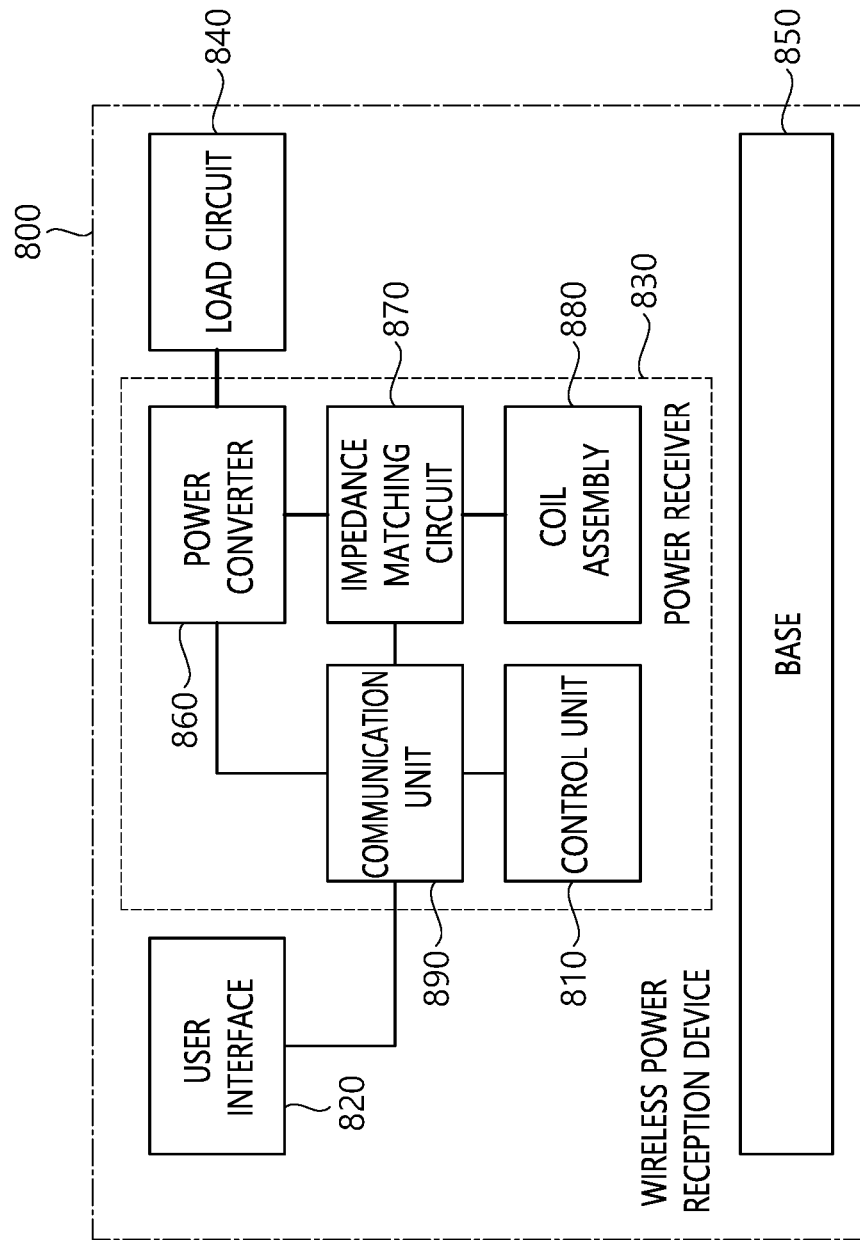
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Hereinafter, foreign object detection in the power transmission step and power calibration according to the foreign object detection result will be described.

When a wireless power transmitter transmits wireless power to a wireless power receiver using a magnetic field, if a foreign object is present therearound, a part of magnetic field may be absorbed to the foreign object. That is, a part of the wireless power transmitted from the wireless power transmitter is supplied to the foreign object and the rest is supplied to the wireless power receiver. From the viewpoint of the efficiency of power transfer, loss of transmitted power occurs as much as power or energy absorbed by the foreign object. Thus, since a causal relationship may be established between the presence of the foreign object and power loss (Floss), the wireless power transmitter may detect how much power loss occurs through the foreign object.

Meanwhile, during the transmission/reception of wireless power, that is, in the power transmission step (refer to FIG. 5), it may be necessary to determine the possibility of the presence of foreign substances between the wireless power receiver and the wireless power transmitter.

For example, when the reception power received by the wireless power receiver changes during transmission/reception of wireless power, or when the rectified voltage changes suddenly, the wireless power receiver and/or the wireless power transmitter may suspect the existence of the foreign object and determine the possibility of the existence of the foreign object.

In addition, for example, during transmission/reception of wireless power, in order to perform recalibration of the wireless power transmitted/received by the wireless power receiver and/or the wireless power transmitter, it performs foreign object detection, it may perform a protocol for power recalibration after it is determined that there is no foreign object. Recalibration of wireless power may be required for, for example, while transmission/reception of wireless power is in the low-power mode, when authentication between the wireless power receiver and the wireless power transmitter is successful and the operation point is changed to switch the wireless power transmission/reception to the high-power mode. Alternatively, recalibration of wireless power may be required even when the operating point is changed to switch from the high power mode to the low power mode.

On the other hand, the foreign object detection method in power transfer (in-power transfer FOD method), which is a foreign object detection method performed in the power transfer phase, can be distinguished from foreign object detection before power transfer (pre-power transfer FOD method), which is a foreign object detection method performed before the power transfer phase.

In particular, various methods can be used as foreign object detection methods in power transfer, a method of stopping power transfer for a short time and performing foreign object detection within a short time when power transfer is stopped may be used. A method of stopping power transfer for such a short time (Slot) and detecting a foreign object can be referred to as foreign object detection using a slot, Slotted FOD, or Slot FOD. Hereinafter, it is collectively referred to as a slotted FOD.

Because slotted FOD stops power transfer for a short period of time, since the amount of decrease in the rectified voltage of the wireless power receiver is not large during the time for detecting a foreign object, the reception of wireless power can be continuously maintained, since it does not affect the operation of the wireless power receiver, there is an advantage that the operation of the wireless power receiver can be continuously maintained.

During the slotted FOD, in the power transfer phase, the wireless power transfer device stops power transfer for a short period of time, there is a slotted Q FOD that detects a foreign object from a change in current and/or voltage that is naturally reduced in a resonant circuit including a transmitting coil.

Figure 9:
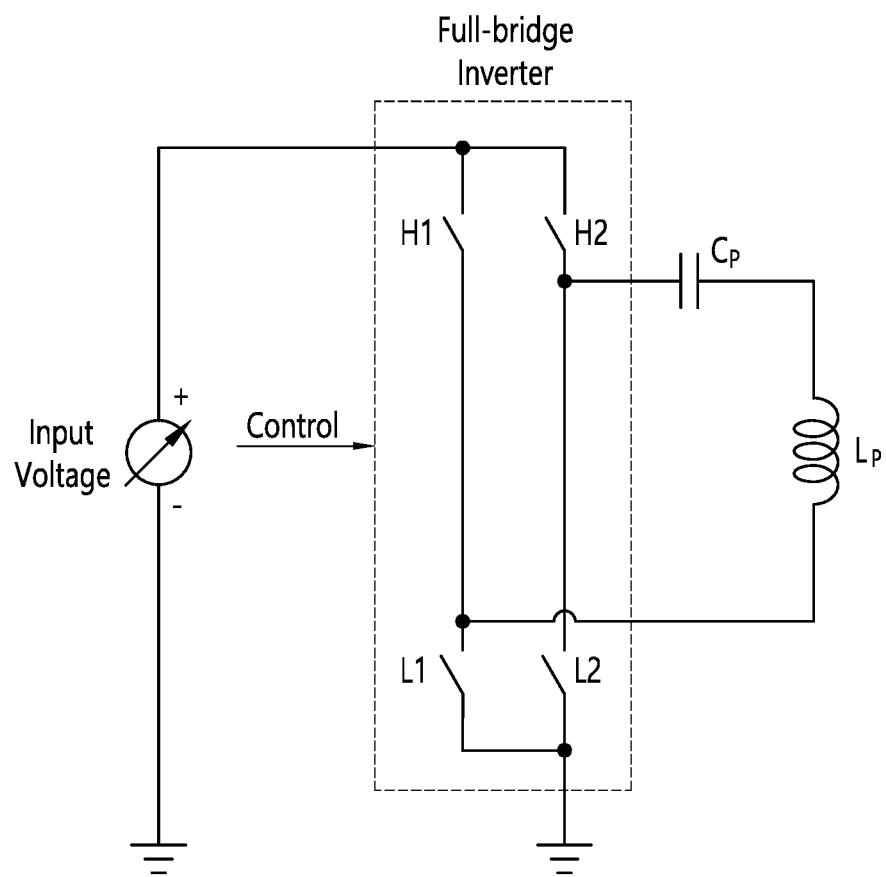
FIG. 9 is a schematic circuit diagram of a wireless power transfer device supporting a foreign object detection method by slotted Q FOD.

FIG. 9 is a schematic circuit diagram of a wireless power transfer device supporting a foreign object detection method by slotted Q FOD.

Referring to FIG. 9, the wireless power transmitter may be outlined as an LC circuit including a full-bridge inverter including four switches H1, H2, L1, and L2. In the power transfer phase, the wireless power transmitter receives power from a power supply expressed as an input voltage and provides wireless power to the wireless power receiver through the transmission coil Lp. At this time, the four switches (H1, H2, L1, L2) of the full-bridge inverter are controlled to constitute a circuit consisting of the input voltage-capacitor (Cp)-transmission coil (Lp).

When forming a slot for foreign object detection, the full-bridge inverter has the H1 and H2 switches open, when the L1 and L2 switches are switched to the closed state, the wireless power transmitter forms a closed-loop resonance circuit composed of a capacitor (Cp)-transmitting coil (Lp), the supply of power to the resonance circuit is cut off. The voltage (or current) of the transmitting coil (Lp) terminal vibrates in a waveform having a resonance frequency according to the capacitance of the capacitor (Cp) and the inductance characteristics of the transmitting coil (Lp), it is gradually attenuated by the resistance that affects the resonance circuit. The Q factor of the LC resonant circuit can be measured from the attenuation ratio of the voltage (or current). And, if there is a foreign object adjacent to the wireless power transmitter, since the Q factor is generally measured lower, the presence of a foreign object can be determined from the Q factor measured in the slot or the voltage (or current) waveform of the transmitting coil (Lp) stage measured in the slot.

Negotiation of Number of Slots and Length of Slots for Slotted Q FOD

Hereinafter, a protocol related to negotiation between the wireless power receiver and the wireless power transmitter with respect to the number of slots and the length of the slot for Slotted Q FOD will be described.

Figure 10:
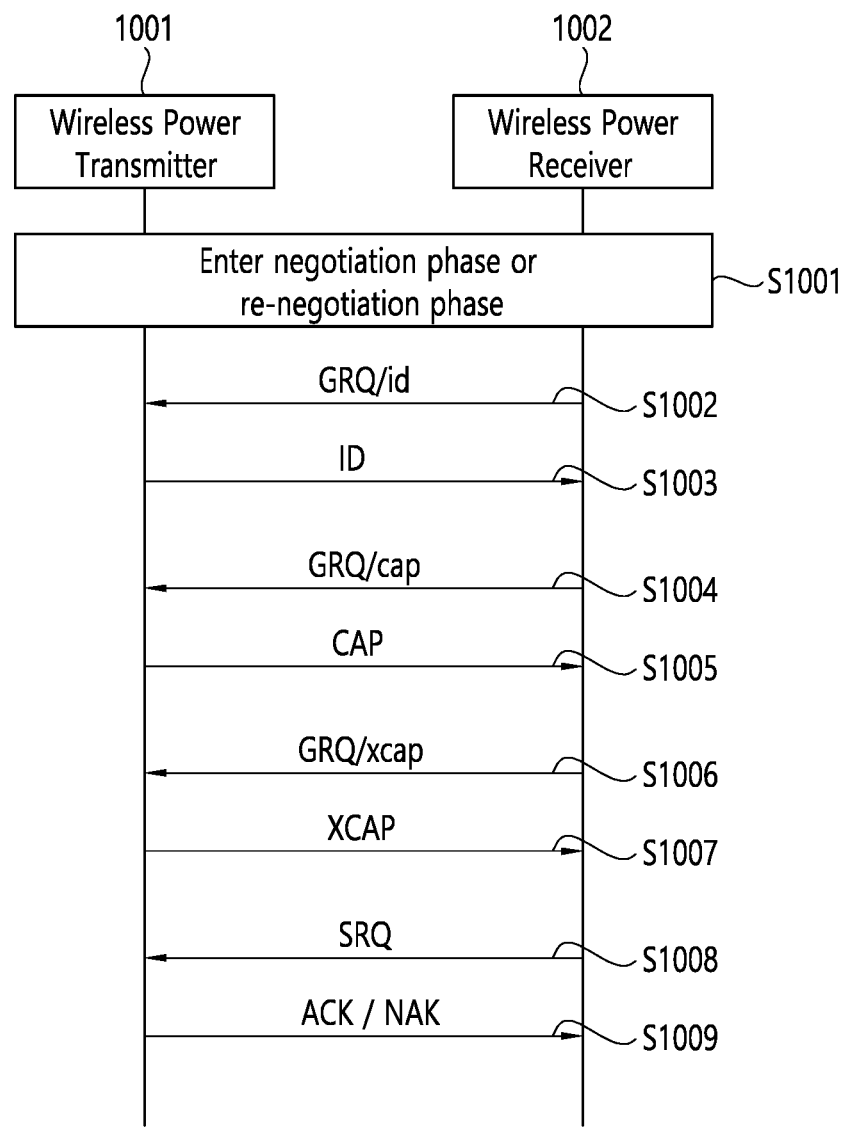
FIG. 10 is a flowchart schematically illustrating a negotiation protocol for the number of slots and the length of slots for Slotted Q FOD according to an embodiment.

FIG. 10 is a flowchart schematically illustrating a negotiation protocol for the number of slots and the length of slots for Slotted Q FOD according to an embodiment.

Referring to FIG. 10, the wireless power transmitter 1001 and the wireless power receiver 1002 enter a negotiation phase or a re-negotiation phase (S1001). Although not shown in FIG. 10, the wireless power transmitter 1001 and the wireless power receiver 1002 enter a negotiation phase through a ping phase, a configuration phase, or after going through the ping phase, the configuration phase, and the negotiation phase, the power transfer phase can be entered and then the re-negotiation phase can be entered.

In the ping phase, the wireless power transmitter 1001 identifies the wireless power receiver 1002 by transmitting a digital ping. Also, the wireless power transmitter 1001 may perform foreign object detection before power transfer to determine whether a foreign object exists in an operating volume. The wireless power receiver 1002 receiving the digital ping transmits a signal strength data packet (SIG) to the wireless power transmitter 1001, the wireless power transmitter 1001 receiving the SIG from the wireless power receiver 1002 may identify that the wireless power receiver 1002 is located in an operating volume.

In the configuration phase, the wireless power receiver 1002 transmits its identification information to the wireless power transmitter, the wireless power receiver 1002 and the wireless power transmitter 1001 may establish a baseline power transfer contract. The wireless power receiver 1002 may transmit an identification data packet (ID) and an extended identification data packet (XID) to the wireless power transmitter 1001 to identify itself, for a power transfer contract, a power control hold-off data packet (PCH) and a configuration data packet (CFG) may be transmitted to the wireless power transmitter 1001.

In the negotiation phase, it expands or changes the power transfer contract related to the reception/transmission of wireless power between the wireless power receiver 1002 and the wireless power transmitter 1001, or a renewal of the power transfer agreement may be made which adjusts at least some of the elements of the power transfer agreement. In addition, in the negotiation phase or the renegotiation phase, the number of slots and the length of the slot for Slotted Q FOD may be negotiated.

Since other details of the ping phase, the configuration phase, and the negotiation phase have been described in FIG. 5 and the like, an additional description thereof will be omitted.

Referring to FIG. 10, the wireless power receiver 1002 may receive an identification data packet (ID) and a capabilities data packet (CAP) of the wireless power transmitter 1001 using a general request data packet (GRQ).

FIG. 11 is a diagram illustrating a format according to an example of a GRQ packet.

Referring to FIG. 11, the GRQ packet includes a 1-byte Requested Power Transmitter Data Packet field (a data packet field of the requested wireless power transmitter). The Requested Power Transmitter Data Packet field may include a header value of a data packet that the wireless power receiver 1002 requests from the wireless power transmitter 1001 using the GRQ packet. For example, when the wireless power receiver 1002 requests the ID packet of the wireless power transmitter 1001 using the GRQ packet, the wireless power receiver 1002 transmits a GRQ packet (GRQ/id) including a header value (0x30) of the ID packet of the wireless power transmitter 1001 in the Requested Power Transmitter Data Packet field.

Referring back to FIG. 10, in the negotiation phase or the renegotiation phase, the wireless power receiver 1002 may transmit a GRQ packet (GRQ/id) requesting the ID packet of the wireless power transmitter 1001 to the wireless power transmitter 1001 (S1002).

The wireless power transmitter 1001 that has received the GRQ/id may transmit the ID packet to the wireless power receiver 1002 (S1003).

FIG. 12 is a diagram illustrating a format according to an example of an ID packet. Referring to FIG. 12, the ID packet of the wireless power transmitter 1001 includes information on the Manufacturer Code. The ID packet including information on the Manufacturer Code allows the manufacturer of the wireless power transmitter 1001 to be identified.

Referring back to FIG. 10, the wireless power receiver 1002 may transmit a GRQ packet (GRQ/cap) requesting the CAP packet of the wireless power transmitter 1001 to the wireless power transmitter 1001 (S1004). The Requested Power Transmitter Data Packet field of the GRQ/cap may include a header value (0x31) of the CAP packet.

The wireless power transmitter 1001 that has received the GRQ/cap may transmit the CAP packet to the wireless power receiver 1002 (S1005).

FIG. 13 is a diagram illustrating a format according to an example of a CAP packet. Referring to FIG. 13, the CAP packet of the wireless power transmitter 1001 includes information related to the performance of the wireless power transmitter 1001. For example, in the CAP packet of the wireless power transmitter 1001, information for Negotiable Load Power, Potential Load Power, whether to support simultaneous data reception/transmission (Dup), whether or not the authentication function is supported (AR), whether out-of-band communication is supported (OB), or etc. may be included.

Referring to FIG. 13, there is no reserved bit in the CAP packet of the wireless power transmitter 1001 except for the extension of power range. Therefore, in order to secure a space for identifying information related to the function of a new wireless power transmitter in the future, such as Slotted Q FOD or RFID detection, it is necessary to define a new packet, such as an Extended Capability packet (XCAP).

In this specification, XCAP for identifying the number of slots and information on the length of the slots for Slotted Q FOD is proposed.

Referring back to FIG. 10, the wireless power receiver 1002 may transmit a GRQ packet (GRQ/xcap) requesting the XCAP packet of the wireless power transmitter 1001 to the wireless power transmitter 1001 (S1004).

The wireless power transmitter 1001 that has received the GRQ/cap may transmit the CAP packet to the wireless power receiver 1002 (S1006). The Requested Power Transmitter Data Packet field of GRQ/xcap may include a header value (e.g., 0x32) of the XCAP packet.

The wireless power transmitter 1001 that has received the GRQ/xcap may transmit the XCAP packet to the wireless power receiver 1002 (S1007).

FIG. 14 is a diagram illustrating a format according to an example of an XCAP packet. Referring to FIG. 14, the XCAP packet may include at least one of information on the number of slots for slotted Q FOD (Number of slots) and information on the length of slots (Slot length).

The information on the number of slots may include information on the number of slots required for the wireless power transmitter 1001 to perform Slotted Q FOD.

For example, a field including information on the number of slots may consist of 3 bits, in this case, the wireless power transmitter 1001 may request a maximum of 7 slots. That is, when the field including information on the number of slots is '111'b, the number of slots for Slotted Q FOD becomes seven.

If the wireless power transmitter (1001) does not support Slotted Q FOD, the wireless power transmitter 1001 may transmit an XCAP packet in which a field including information on the number of slots is set to '000'b.

The information on the length of the slot may include information on the length of the slot required for the wireless power transmitter 1001 to perform Slotted Q FOD. The length of the slot may be a time at which the wireless power transmitter 1001 stops power transfer and/or a time at which a foreign object check is performed during power transfer. Also, the length of the slot may be a minimum value of the length of one slot required for the wireless power transmitter 1001 to perform Slotted Q FOD.

The value of the slot time field may be a value specifying any one of values of 200 μs or less. A field including information on the number of slots may consist of 3 bits. For example, it may be as '111'b means 200 μs, '110'b means 180 μs, '101'b means 160 μs, '100'b means 140 μs, '011'b means 110 μs or 120 μs, '010'b means 100 μs, '001'b means 80 μs.

If the wireless power transmitter (1001) does not support Slotted Q FOD, the wireless power transmitter 1001 may transmit an XCAP packet in which a field including information on the length of a slot is set to '000'b.

Referring back to FIG. 10, the wireless power receiver 1002 that has received the XCAP packet may negotiate with the wireless power transmitter 1001 for a length of a slot required to perform slotted Q FOD using a specific request data packet (SRQ).

Figure 15:
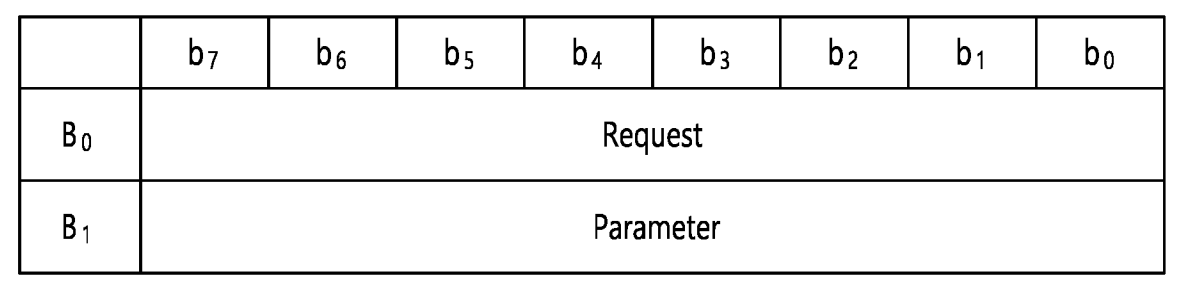

FIG. 15 is a diagram illustrating a format according to an example of an SRQ packet. Referring to FIG. 15, the SRQ may include a byte (B0) including a Request field and a byte (B1) including a Parameter field.

Since the request values of the current SRQ, 0x00, 0x01, 0x02, 0x03, 0x04 and 0x05 are already used as SRQ/en, SRQ/gp, SRQ/rpr, SRQ/fsk, SRQ/rp, SRQ/rep, respectively, the Request value of SRQ (SRQ/rcs) used to transmit slot length information for Slotted Q FOD may be used as a value other than 0x00, 0x01, 0x02, 0x03, 0x04 and 0x05.

The Parameter field of SRQ/rcs may include information on the length of the slot proposed by the wireless power receiver 1002. Information on the length of the slot may be composed of 3 bits. For example, it may be the same as '111'b means 200 μs, '110'b means 180 μs, '101'b means 160 μs, '100'b means 140 μs, '011'b means 110 μs or 120 μs, '010'b means 100 μs, or '001'b means 80 μs.

The wireless power receiver 1002 may set information on the length of the slot included in the SRQ/rcs based on the information on the length of the slot included in the XCAP packet. For example, the wireless power receiver 1002 may transmit a slot length greater than the slot length derived from information on the slot length included in the XCAP packet to the wireless power transmitter 1001 through SRQ/rcs. That is, the wireless power transmitter 1001 transmits information on the minimum slot length to the wireless power receiver 1002 using the XCAP packet, the wireless power receiver 1002 sets the maximum slot length based on the minimum slot length identified through the XCAP packet, information on the maximum slot length may be transmitted to the wireless power transmitter 1001 through SRQ/rcs (S1008).

The wireless power transmitter 1001 that has received the SRQ/rcs determines the maximum slot length proposed by the wireless power receiver 1002 through the SRQ/rcs, in response to this, ACK or NAK is transmitted to the wireless power receiver 1002 (S1009).

The wireless power transmitter 1001 transmits an ACK when the Slotted Q FOD can be performed using a slot length shorter than the maximum slot length proposed by the wireless power receiver 1002, if the slotted Q FOD cannot be performed using a slot length shorter than the maximum slot length suggested by the wireless power receiver 1002, NAK can be transmitted.

When the wireless power transmitter 1001 transmits an ACK in response to the SRQ/rcs, the wireless power receiver 1002 and the wireless power transmitter 1001 complete the negotiation on the slot length (e.g., the minimum slot length and the first slot length) for the Slotted Q FOD. The wireless power receiver 1002 may request information for renewing a power transfer contract from the wireless power transmitter 1001 using an additional SRQ, or it may report the received power or notify the end of the negotiation phase.

When the wireless power transmitter 1001 transmits a NAK in response to the SRQ/rcs, the wireless power receiver 1002 may transmit the SRQ/rcs including information on the maximum slot length shorter than the previously proposed maximum slot length to the wireless power transmitter 1001. The wireless power transmitter 1001 transmits an ACK when the Slotted Q FOD can be performed using a slot length shorter than the maximum slot length proposed by the wireless power receiver 1002, when the Slotted Q FOD cannot be performed using a slot length shorter than the maximum slot length proposed by the wireless power receiver 1002, the NAK may be transmitted.

The wireless power receiver 1002 may transmit the SRQ/rcs while adjusting the maximum slot length until an ACK is received in response to the SRQ/rcs.

According to the above-described FIGS. 9 to 15, since the wireless power transmitter 1001 may transmit information about the number of slots and the length of the slots for Slotted Q FOD to the wireless power receiver 1002 in advance in the negotiation phase and/or the renegotiation phase, by proposing information on the slot for Slotted Q FOD according to the foreign object detection performance of the wireless power transmitter 1001, it becomes possible to perform more stable Slotted Q FOD.

In addition, in the negotiation phase and/or renegotiation phase, since the wireless power transmitter 1001 and the wireless power receiver 1002 negotiate in advance for the number of slots for Slotted Q FOD and the length of the slot (eg, the minimum slot length and/or the maximum slot length), Slotted Q FOD, which can be performed during power transfer in the power transfer phase, can be performed quickly within clearer conditions.

Foreign Object Detection Request by Wireless Power Receiver

Hereinafter, in the power transfer phase, a protocol related to a foreign object detection request by the wireless power receiver will be described.

Figure 16:
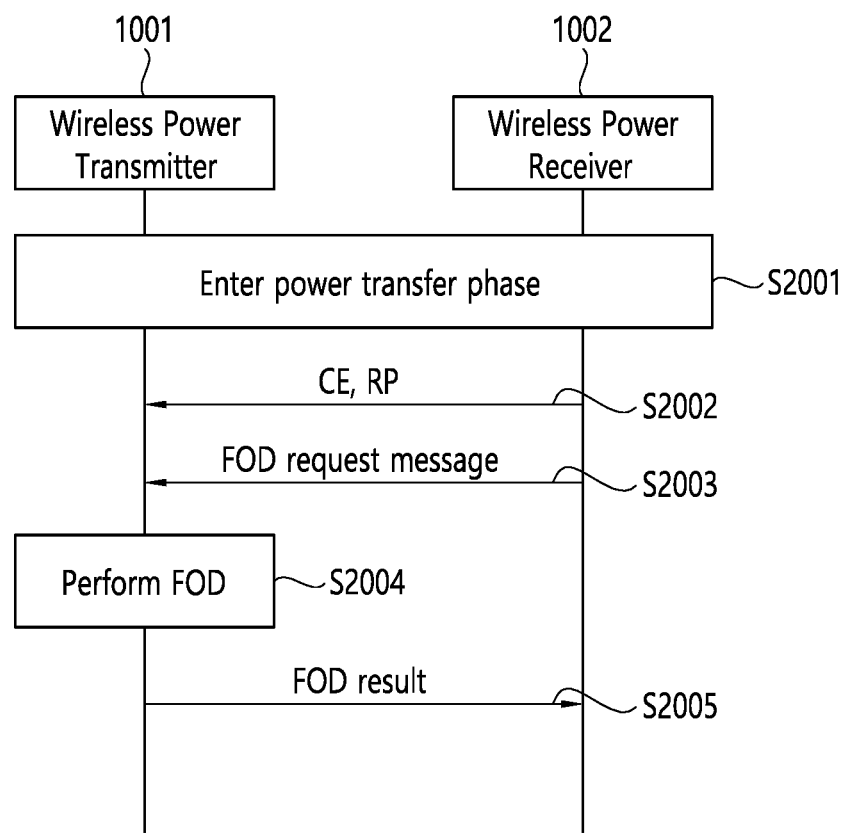
FIG. 16 is a flowchart schematically illustrating a protocol related to a foreign object detection request by a wireless power receiver in a power transfer phase according to an embodiment.

FIG. 16 is a flowchart schematically illustrating a protocol related to a foreign object detection request by a wireless power receiver in a power transfer phase according to an embodiment.

Referring to FIG. 16, the wireless power transmitter 1001 and the wireless power receiver 1002 enter a power transfer phase (S2001). Although not shown in FIG. 16, the wireless power transmitter 1001 and the wireless power receiver 1002 go through a ping phase, a configuration phase, and a negotiation phase before entering the power transfer phase, it may have entered the power transfer phase.

Since other details of the ping phase, the configuration phase, and the negotiation phase have been described with reference to FIGS. 5 and 10, an additional description thereof will be omitted.

As described with respect to FIGS. 10 to 15, the wireless power transmitter 1001 and the wireless power receiver 1002 may have entered a power transfer phase after completing the negotiation on the number of slots and the length of the slots (e.g., the minimum slot length and the maximum slot length) required to perform Slotted Q FOD in the negotiation phase or the renegotiation phase, Referring back to FIG. 16, after the wireless power receiver 1002 enters the power transfer phase, as information about the wireless power received from the wireless power transmitter 1001, it transmits a Control Error data packet (CE) and a Received Power data packet (RP) to the wireless power transmitter 1001 (S2002). The control error packet and the received power packet must be transmitted within a predetermined time interval (tinterval, treceived) throughout the power transmission phase, respectively.

In the power transfer phase, if foreign object detection is required (e.g. before power calibration or after power calibration), the wireless power receiver 1002 may transmit a foreign object detection (FOD) request message (data packet) to the wireless power transmitter 1001 (S2003).

The wireless power transmitter 1001 receiving the message requesting foreign object detection from the wireless power receiver 1002 performs foreign object detection using the in-power transfer FOD method in power transfer (S2004). The wireless power transmitter 1001 may form a slot for stopping power transfer for a short time and perform slotted FOD for performing foreign object detection within the slot.

The wireless power transmitter 1001 that has performed the foreign object detection transmits the foreign object detection result to the wireless power receiver 1002 (S2005). The foreign object detection result may be expressed as ACK or NAK. That is, when it is determined that there is no foreign object as a result of performing foreign object detection, the wireless power transmitter 1001 transmits an ACK to the wireless power receiver 1002, k fit is determined that the foreign object exists, the NAK may be transmitted to the wireless power receiver 1002.

The wireless power receiver 1002 that has received the NAK in response to the wireless power transmitter 1001 to the message requesting foreign object detection (FOD) may again transmit a message requesting foreign object detection (FOD) to the wireless power transmitter 1001, the wireless power receiver 1002 that has continuously received the NAK in response to the message requesting foreign object detection (FOD) maintains the existing operation point and receives power according to the existing power transfer contract, it switches to a low-power mode where the received power is equal to or less than 5 W, or it stops the power transfer phase by transmitting an End Power transfer data packet (EPT) to the wireless power transmitter 1001, or it resets the wireless power transmitter 1001, or it initializes a protocol for wireless power transfer so that foreign object detection (pre-power transfer FOD) is performed before power transfer.

FIG. 17 is a diagram illustrating a format of a message requesting foreign object detection (FOD) according to an example.

As a message for requesting foreign object detection (FOD), the wireless power receiver 1002 may use a received power packet (RP) including information on a slot. Referring to FIG. 17, RP including information about the slot may include a byte (B0) including a slot length field (Slot Length) and a mode field (Mode) and bytes (B1, B2) including an Estimated Received Power Value field.

The value of the slot length field may include information on the slot length for foreign object detection. The slot length may be a time at which the wireless power transmitter 1001 stops power transfer and/or a time at which a foreign object check is performed during power transfer. For example, the value of the slot length field may be a value specifying any one of values equal to or less than 200 µs. For example, it can be expressed as '111'b means 200 µs, '110'b means 180 µs, '101'b means 160 µs, '100'b means 140 µs, '011'b means 120 µs, '010'b means 100 µs, '001'b means 80 µs. The slot length may be a value between the minimum slot length and the maximum slot length negotiated by the wireless power receiver 1002 and the wireless power transmitter 1001 in the negotiation phase or the renegotiation phase.

The wireless power transmitter 1001 that has received the RP requesting foreign object detection (FOD) may stop the supply of wireless power during the slot length specified based on the value of the slot length field of the RP, after it performs foreign object detection based on changes in current or voltage of the power transfer coil, it may resume power transfer.

According to this embodiment, using the RP packet including information about the slot length in the power transfer phase, the wireless power receiver may enable Slotted FOD to be performed. In addition, since the wireless power receiver sets the slot time for foreign object detection and transmits it to the wireless power transmitter, the wireless power receiver may select and set a slot time according to its own state and/or wireless charging environment.

Foreign Object Detection Request by Wireless Power Transmitter

Hereinafter, a protocol related to a foreign object detection request by a wireless power transmitter in the power transfer phase will be described.

Figure 18:
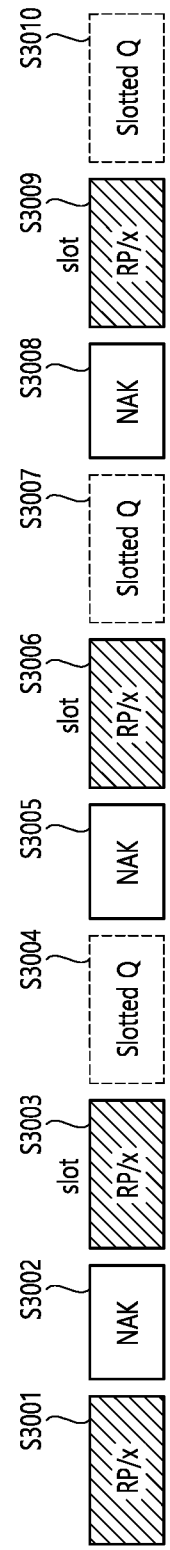
FIG. 18 is a diagram schematically illustrating a protocol related to a foreign object detection request by a wireless power device in a power transfer phase according to an embodiment.

FIG. 18 is a diagram schematically illustrating a protocol related to a foreign object detection request by a wireless power device in a power transfer phase according to an embodiment.

The wireless power receiver 1002 periodically transmits a received power packet (RP/0) having a value of 0 in the mode field during a power transfer phase, etc., for power calibration, a received power packet (RP/1, RP/2) with a mode field value of 1 or 2 is transmitted. Hereinafter, RP/0, RP/1 and RP/2 are collectively referred to as RP/x.

In the power transfer phase, based on the Estimated Received Power Value checked through RP/x (e.g., RP/0) received from the wireless power receiver 1002, the wireless power transmitter 1001 may determine the amount of power loss. When the power loss approaches the threshold of foreign object detection (FOD), the wireless power transmitter may request a slot for slotted FOD by responding with a NAK to a received power packet (RP/x, eg, RP/0) packet.

Referring to FIG. 18, RP/x is received from the wireless power receiver 1002 (S3001). The RP/x received in the S3001 phase may be a received power packet that does not include information on the slot (information on the length of the slot).

The wireless power transmitter 1001 suspected of having a foreign object responds with NAK to RP/x (S3002). That is, the wireless power transmitter 1001 may request a slot for the slotted FOD by responding with NAK for RP/x.

The wireless power receiver 1002 that has received the NAK in response to the RP/x transmits the RP/x including the slot information to the wireless power transmitter 1001 (S3003), a slot may be allowed so that the wireless power transmitter 1001 can perform slotted FOD. Since the contents of initiating the Slotted FOD using RP/x including information on the slot have been previously described in FIGS. 16 and 17, a detailed description thereof will be omitted.

The wireless power transmitter 1001 that has received the RP/x containing information on the slot stops the power transfer during the slot length based on the information on the slot length included in the RP/x containing the information about the slot, Slotted FOD performing foreign object detection in the slot may be performed (S3004).

The wireless power receiver 1002 may allow the number of slots requested by the wireless power transmitter 1001 through the XCAP packet in the negotiation phase or the renegotiation phase.

When the wireless power transmitter 1001 requests 3 slots through the XCAP packet, after performing the slotted FOD in the first slot (S3004), the wireless power transmitter 1001 may transmit a NAK to request the second slot (S3005).

The wireless power receiver 1002 that has received the NAK transmits the RP/x including the slot information to the wireless power transmitter 1001 (S3006), allowing the second slot.

After performing the slotted FOD in the second slot (S3007), the wireless power transmitter 1001 may transmit a NAK to request the third slot (S3008).

The wireless power receiver 1002 that has received the NAK may transmit the RP/x including the slot information to the wireless power transmitter 1001 (S3009), allowing the third slot.

After performing the slotted FOD in the third slot (S3010), the wireless power transmitter 1001 may transmit the result of the slotted FOD to the wireless power receiver 1002.

The foreign object detection result may be expressed as ACK or NAK. That is, when it is determined that there is no foreign object as a result of performing foreign object detection, the wireless power transmitter 1001 transmits an ACK to the wireless power receiver 1002, if it is determined that the foreign object exists, the NAK may be transmitted to the wireless power receiver 1002.

Since the wireless power receiver 1002 identifies the number of slots required for the slotted FOD through the XCAP packet in the negotiation phase or the renegotiation phase, the wireless power receiver 1002 may distinguish whether the NAK received in response to the RP/x is a response requesting an additional slot or a foreign object detection result.

On the other hand, for received power packet (RP/1, RP/2) whose mode field value is 1 or 2 for power calibration, the response (ACK, NAK, ND, ATN) of the wireless power transmitter 1001 may be interpreted as follows depending on whether information about the slot is included in RP/1 and/or RP/2.

In the response (ACK, NAK, ND, ATN) of the wireless power transmitter 1001 for RP/1 and/or RP/2 that does not contain information about the slot, ACK can be interpreted to mean accepting the power calibration data point included in RP/1 or RP/2, NAK can be interpreted as meaning that the power calibration data point included in RP/1 or RP/2 is not accepted because the Control Error (CE) Value is not stable to converge to 0, ND can be interpreted as meaning that the wireless power transmitter 1001 does not support the mode of the received power packet in the current stage of the power transfer phase, or ATN can be interpreted to mean that the wireless power transmitter has more comprehensive information to report.

In the response (ACK, NAK, ND, ATN) of the wireless power transmitter 1001 for RP/1 and/or RP/2 that includes information about the slot, ACK can be interpreted to mean that the foreign object does not exist, NAK can be interpreted to mean that there is a possibility that a foreign object exists, ND may be interpreted as meaning that the wireless power transmitter 1001 does not support Slotted FOD, or ATN can be interpreted to mean that the wireless power transmitter has more comprehensive information to report.

Meanwhile, according to an embodiment, the received power packet (RP/x) that the wireless power transmitter 1001 can respond to with NAK in order to receive a slot for the slotted FOD may be limited to RP/0. In this case, RP/x of S3001, S3003, S3006 and S3009 phases may be limited to RP/0.

According to the embodiment described based on FIG. 18, when the wireless power transmitter 1001 suspects the presence of a foreign object in the power transfer phase, by causing the wireless power receiver 1002 to transmit a foreign object detection (FOD) request message (received power packet including slot information) to the wireless power transmitter 1001, the wireless power transmitter 1001 may perform foreign object detection at a desired timing.

The wireless power transmitter in the embodiment according to the above-described FIGS. 9 to 18 corresponds to the wireless power transmitter or the wireless power transmission apparatus or the power transfer unit disclosed in FIGS. 1 to 8. Accordingly, the operation of the wireless power transmitter in this embodiment is implemented by one or a combination of two or more of the respective components of the wireless power transmitter in FIGS. 1 to 8. For example, according to FIGS. 9 to 18, reception/transmission of data packets, determination of necessity of foreign object detection, foreign object detection, and configuration of a power calibration curve are included in the operation of the communication/control unit 120, 710 or 790.

The wireless power receiving apparatus in the embodiment according to the above-described FIGS. 9 to 18 corresponds to the wireless power receiving apparatus or the wireless power receiver or the power receiving unit disclosed in FIGS. 1 to 8. Accordingly, the operation of the wireless power receiver in this embodiment is implemented by one or a combination of two or more of the respective components of the wireless power receiver in FIGS. 1 to 8. For example, determination of necessity of foreign object detection and reception/transmission of data packets according to FIGS. 9 to 18 may be included in the operation of the communication/control unit 220, 810, or 890.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power transmitter for transferring a wireless power to a wireless power receiver comprising:
   a power converter configured to transfer the wireless power to the wireless power receiver; and
   a communicator/controller configured to control the wireless power,
   wherein the wireless power transmitter
   enters a negotiation phase with the wireless power receiver;
   receives, from the wireless power receiver in the negotiation phase, a general request (GRQ) data packet for a capability (CAP) data packet;
   transmits, to the wireless power receiver in the negotiation phase, the CAP data packet including a negotiable load power for the wireless power transmitter in response to the GRQ data packet for the CAP data packet;
   receives, from the wireless power receiver in the negotiation phase, a GRQ data packet for an extended capability (XCAP) data packet;
   transmits, to the wireless power receiver in the negotiation phase, the XCAP data packet including information for a minimum slot length,
   wherein the minimum slot length is related to a length of a shortest slot which the wireless power transmitter supports,
   enters a power transfer phase with the wireless power receiver after the negotiation phase;
   transfers, to the wireless power receiver in the power transfer phase, the wireless power; and
   receives, from the wireless power receiver in the power transfer phase, a specific data packet related to a slotted foreign object detection,
   performs the slotted foreign object detection in the power transfer phase based on receiving the specific data packet,
   wherein, in the slotted foreign object detection, the wireless power transmitter generates a slot, stops the transfer of the wireless power during the slot and detects whether a foreign object is present on the slot,
   wherein the wireless power transmitter resumes the transfer of the wireless power after the slot has elapsed, and
   wherein a length of the slot is equal to or longer than the minimum slot length.

2. The wireless power transmitter of claim 1, wherein the information for the minimum slot length is expressed by 3 bits.

3. The wireless power transmitter of claim 1, wherein the information for the minimum slot length having a value of 0 means that the wireless power transmitter does not support a foreign object detection based on a slot.

4. The wireless power transmitter of claim 1, wherein the minimum slot length is 200 μsec or less.

5. A method for transferring a wireless power to a wireless power receiver, the method performed by a wireless power transmitter and comprising:

entering a negotiation phase with the wireless power receiver;

receiving, from the wireless power receiver in the negotiation phase, a general request (GRQ) data packet for a capability (CAP) data packet;

transmitting, to the wireless power receiver in the negotiation phase, the CAP data packet including a negotiable load power for the wireless power transmitter in response to the GRQ data packet for the CAP data packet;

receiving, from the wireless power receiver in the negotiation phase, a GRQ data packet for an extended capability (XCAP) data packet;

transmitting, to the wireless power receiver in the negotiation phase, the XCAP data packet including information for a minimum slot length, wherein the minimum slot length is related to a length of a shortest slot which the wireless power transmitter supports;

entering a power transfer phase with the wireless power receiver after the negotiation phase;

transferring, to the wireless power receiver in the power transfer phase, the wireless power; and receiving, from the wireless power receiver in the power transfer phase, a specific data packet related to a slotted foreign object detection, performing the slotted foreign object detection in the power transfer phase based on receiving the specific data packet, wherein, in the slotted foreign object detection, the wireless power transmitter generates a slot, stops the transfer of the wireless power during the slot and detects whether a foreign object is present on the slot, wherein the wireless power transmitter resumes the transfer of the wireless power after the slot has elapsed, and wherein a length of the slot is equal to or longer than the minimum slot length.

6. The method of claim 5, wherein the information for the minimum slot length is expressed by 3 bits.

7. The method of claim 5, wherein the information for the minimum slot length having a value of 0 means that the wireless power transmitter does not support a foreign object detection based on a slot.

8. The method of claim 5, wherein the minimum slot length is 200 μsec or less.

* * * * *